(12) United States Patent  
Lee et al.

(10) Patent No.: US 8,983,005 B2  
(45) Date of Patent: Mar. 17, 2015

(54) RECEIVING APPARATUS AND METHOD FOR PROVIDING INPUT BITS OF FAST FOURIER TRANSFORMER ACCORDING TO MODULATION

(75) Inventors: Yong-Su Lee, Daejeon-si (KR);
Young-Il Kim, Daejeon-si (KR);
Cheol-Hye Cho, Daejeon-si (KR);
Sung-Hee Kim, Daejeon-si (KR);
Young-Soo Park, Daejeon-si (KR);
Dae-Geun Park, Daejeon-si (KR);
Sun-Sim Chun, Daejeon-si (KR);
Yeon-Joon Chung, Daejeon-si (KR);
Won Ryu, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 544 days.

(21) Appl. No.: 13/291,689

(22) Filed: Nov. 8, 2011

(65) Prior Publication Data

US 2012/0114055 A1 May 10, 2012

(30) Foreign Application Priority Data

Nov. 9, 2010 (KR) .................. 10-2010-0111011

(51) Int. Cl.
*H04L 27/00* (2006.01)
*H03K 9/00* (2006.01)
*H04L 27/26* (2006.01)
(Continued)

(52) U.S. Cl.
CPC .......... *H04L 27/265* (2013.01); *H04L 27/0008* (2013.01); *H04L 27/0012* (2013.01); *H04L 27/22* (2013.01); *H04L 27/38* (2013.01)
USPC ............................ 375/329; 375/316; 375/324

(58) Field of Classification Search
CPC .................. H04L 1/0045; H04L 2025/03401;
H04L 27/265; H04L 5/0007; H04B 7/0617;
H04J 11/0023; H04J 11/0063; H04W 72/0453

USPC ......... 375/295, 296, 298, 316, 324, 326, 327,
375/340, 341, 347, 346, E1.032, 1, 44, 299,
375/349, 219, 222, 240.26–240.27, 259,
375/261, 268, 271, 279, 280, 309, 308, 310,
375/3, 22, 329, 354; 370/210, 203;
455/101, 103, 226.1
See application file for complete search history.

(56) References Cited

U.S. PATENT DOCUMENTS 6,760,741 B1    7/2004  Vinitzky
2010/0067627 A1*  3/2010  Lincoln et al. ................ 375/346
(Continued)

FOREIGN PATENT DOCUMENTS

| JP | 2002-032359 | 1/2002 |
| KR | 1020050026193 | 3/2005 |
| KR | 1020100003711 | 1/2010 |

OTHER PUBLICATIONS

*Quantization and its Effects on OFDM Concepts for Wireless Indoor Applications*, Schmidt and Kammeyer, University of Bremen.
(Continued)

*Primary Examiner* — Sam K Ahn
*Assistant Examiner* — Linda Wong
(74) *Attorney, Agent, or Firm* — H.C. Park & Associates, PLC

(57) ABSTRACT

A technology is provided capable of improving the efficiency of an OFDM system by obtaining the performance in Bit Error Rate (BER) in a wireless communication using OFDM and determining the minimum FFT input bit that produces a SNR difference of 0.1 dB or below with respect to a theoretical BER graph at a desired performance.

7 Claims, 5 Drawing Sheets

(51) Int. Cl.
*H04L 27/22* (2006.01)
*H04L 27/38* (2006.01)

(56) References Cited

U.S. PATENT DOCUMENTS

2010/0172337 A1* 7/2010 Cho et al. .................. 370/344
2012/0008663 A1* 1/2012 Schilling .................... 375/146

OTHER PUBLICATIONS

Altera Corporation, "Implementing OFDM Modulation for Wireless Communications", Jan. 2008, pp. 1-18, version 1.0, Altera Corporation, USA.

* cited by examiner

US 8,983,005 B2

RECEIVING APPARATUS AND METHOD FOR PROVIDING INPUT BITS OF FAST FOURIER TRANSFORMER ACCORDING TO MODULATION

CROSS-REFERENCE TO RELATED APPLICATION

This application claims the benefit under 35 U.S.C. §119(a) of Korean Patent Application No. 10-2010-0111011, filed on Nov. 9, 2010, the disclosure of which is incorporated by reference in its entirety for all purposes.

BACKGROUND

1. Field

The following description relates to a terminal that is used in an Orthogonal Frequency Division Multiplexing (OFDM) system, and an apparatus and a method for minimizing the number of input bits of a Fast Fourier Transformer (FFT) in performing a fast fourier transformation at a receiving end of a OFDM based Wibro terminal.

2. Description of the Related Art

When a received symbol is modulated in an Orthogonal Frequency Division Multiplexing (OFDM) system, the modulation is performed using Fast Fourier Transform (FFT). Since a FFT engine is highly regarded in implementing the overall OFDM system, many studies have been undertaken to enhance the implementation efficiency of the FFT engine.

Various methods have been proposed to effective implement the inner logic of the FFT engine. According to a technology related to the input bits providing the optimum performance of the FFT, at least 6 bits of input bits are required to obtain Signal to Noise Ratio (SNR) loss of 0.1 dB or below, that is, 6 bits are the minimum number of input bits without affecting the FFT performance.

The FFT engine is highly regarded in implementing the overall OFDM system. Accordingly, as the number of input bits of the FFT engine increases, the complexity of the interior design of the FFT engine is significantly increased.

Accordingly, there is a need to obtain the performance in Bit Error Rate (BER) in a wireless communication using OFDM and determine the minimum FFT input bit that produces a SNR difference of 0.1 dB or below with respect to a theoretical graph at a desired performance. In addition, there is a need to know the change of the minimum input bit of the FFT engine according to the modulation scheme and adaptively determine the number of the FFT input bits.

SUMMARY

In one aspect, there is provided a technology capable of obtaining the performance in Bit Error Rate (BER) in a wireless communication using OFDM and determining the minimum FFT input bit that produces a SNR difference of 0.1 dB or below with respect to a theoretical BER graph at a desired performance.

In addition, there is provided a technology capable of knowing the change of the minimum input bit of the FFT engine according to the modulation scheme and adaptively determining the number of the FFT input bits.

In one general aspect, there is provided a receiving apparatus for providing input bits for a Fast Fourier Transformer (FFT) according to a modulation scheme on an Orthogonal Frequency Division Multiplexing (OFDM) system using Fourier Transform (FT), the receiving apparatus including: a modulation scheme determiner configured to determine a modulation scheme, which is performed on an OFDM signal received on the OFDM system; and an input bit determiner configured to provide upper 7 bits of the OFDM signal as input bits for a Fast Fourier Transformer, if the modulation scheme determiner determines that the OFDM signal is a Quadrature Phase Shift Keying (QPSK) signal.

The input bit determiner may provide upper 8 bits of the OFDM signal as input bits for the Fast Fourier Transformer if the modulation scheme determiner determines that the OFDM signal is a 16 Quadrature Amplitude Modulation (16 QAM) signal.

In another general aspect, there is provided An Orthogonal Frequency Division Multiplexing (OFDM) signal receiving method for providing input bits for a Fast Fourier Transformer (FFT) according to a modulation scheme, the method including: receiving an OFDM signal that is modulated by a predetermined modulation scheme in an OFDM system; determining a modulation scheme that is performed on the received OFDM signal; and providing upper 7 bits of the OFDM signal as input bits for the FFT, which is included in a receiving apparatus on the OFDM system, if the modulation scheme is determined to a Quadrature Phase Shift Keying (QPSK).

In the providing of input bits, upper 8 bits of the OFDM signal may be provided as input bits for the FFT if the modulation scheme is determined to 16 Quadrature Amplitude Modulation (16 QAM).

As described above, the performance in Bit Error Rate (BER) is obtained in a wireless communication using OFDM and the minimum FFT input bit producing a SNR difference of 0.1 dB or below with respect to a theoretical graph at a desired performance is determined In addition, the change of the minimum input bit of the FFT engine according to the modulation scheme is obtained and the number of the FFT input bits is determined based on the change of the number of the minimum input bit.

In addition, according to a computer simulation on a QPSK symbol the FFT performance is maintained when the number of input bits is 7 or above, and in the case of 16 QAM symbols, the FFT performance is maintained when the number of input bits is 8 or above.

In addition, the performance is maintained to be equivalent to the theoretical FFT performance. The number of FFT input bits is adaptively determined according to the modulation scheme, so that the complexity of the interior of the FFT engine is decreased and the power consumption is reduced.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, an example will be described with reference to accompanying drawings.

Figure 1:
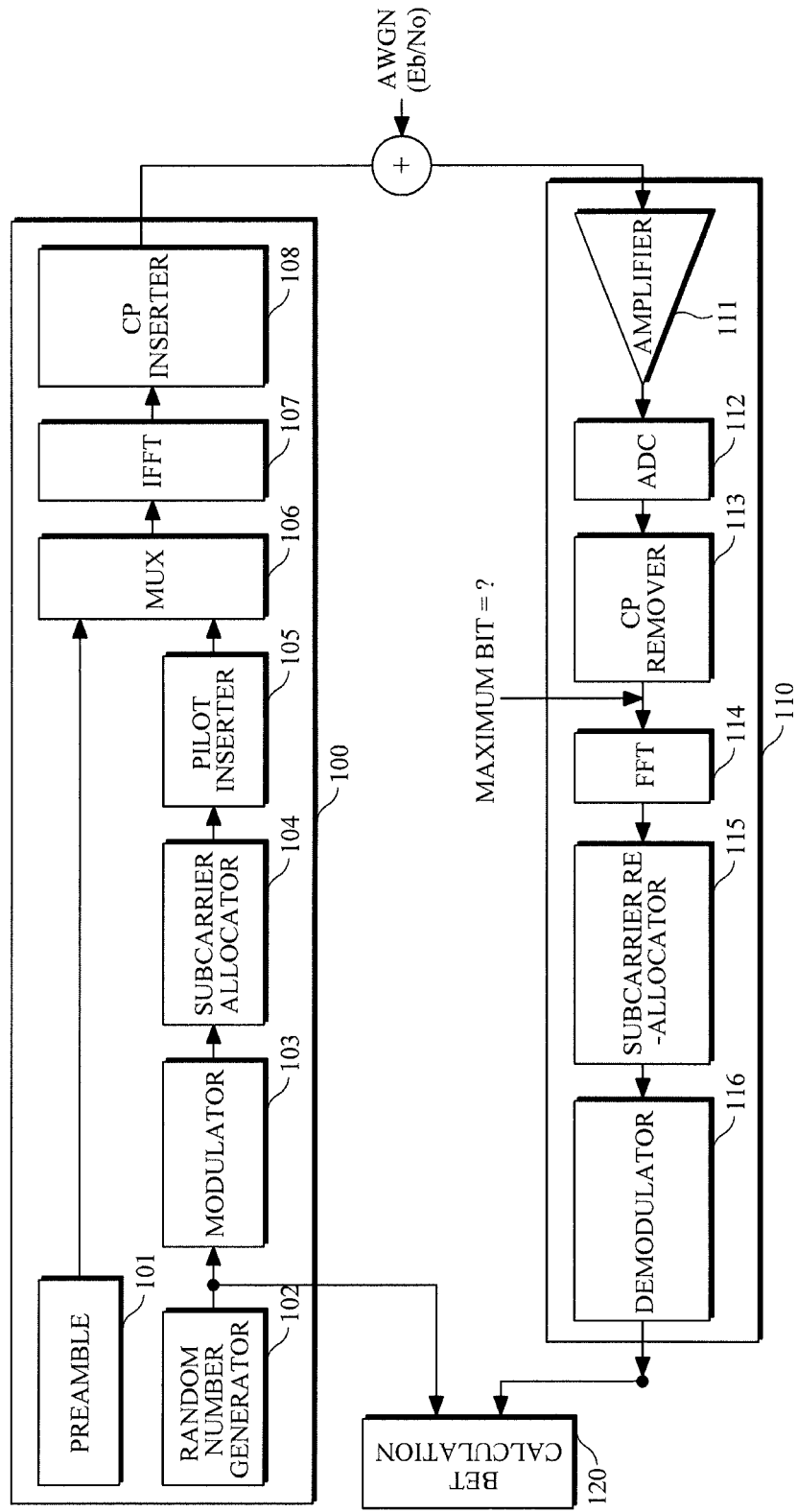
FIG. 1 is a diagram illustrating an example of a transmitting device and a receiving device on an Orthogonal Frequency Division Multiplexing (OFDM) system.

FIG. 1 is a diagram illustrating an example of a transmitting device and a receiving device on an Orthogonal Frequency Division Multiplexing (OFDM) system. As shown in FIG. 1, a transmitting device 100 and a receiving device 110 on an Orthogonal Frequency Division Multiplexing (OFDM) have the following configuration.

The transmitting device 100 includes a preamble 101, a random number generator 102, a modulator 103, a subcarrier allocator 104, a pilot inserter 105, a Mux 106, an Inverse Fast Fourier Transformer (IFFT) 107 and a cyclic prefix (CP) inserter 108.

The receiving device 110 includes an amplifier 111, an analog-to-digital converter 112, a cyclic prefix (CP) remover 113, a Fast Fourier Transformer (FFT) 114, a subcarrier re-allocator 115 and a demodulator 116.

When a OFDM signal, which is converted through the above described components of the transmitting device 100 on the OFDM system, is transmitted to the receiving device 110, noise may be added to the OFDM signal. Such noise is assumed as Additive White Gaussian Noise (AWGN).

The AWGN is an implementation of noise coming from all of the transmission medium/communication equipment and many natural sources, such as thermal vibrations of electrons of a conductor. Since free electrons of solid elements forming a communication equipment vibrates due to heat, the voltage of noise randomly varies with time. The distribution of noise complies with a normal distribution, that is, Gaussian distribution.

A bit error rate (BET) is calculated by comparing an original signal, which is desired to transmit from the transmitting device 100, with a signal, which is obtained by regenerating a received signal including noise. The BET calculation 120 is shown as a graph in FIGS. 2 and 3.

Figure 2:
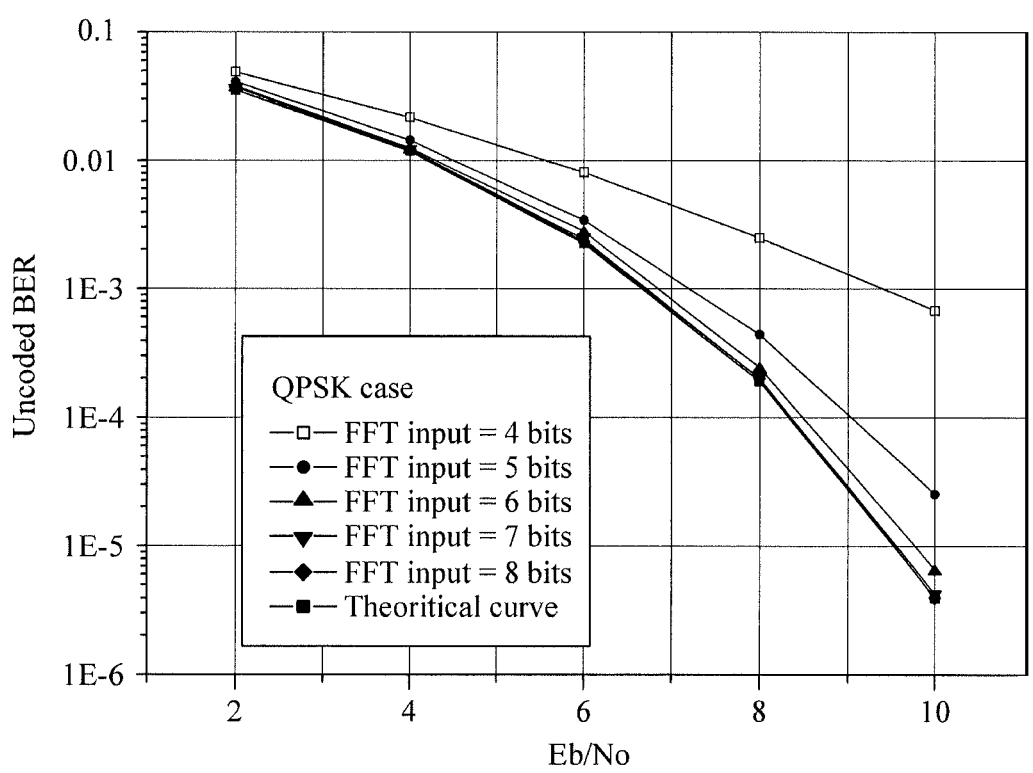
FIG. 2 is a graph illustrating the BER performance when a QPSK modulation is used in the OFDM system.

FIG. 2 shows the BER performance when QPSK modulation is used on the OFDM system.

In FIG. 2, Uncoded BER performance is obtained by simulating the transmitting device 100 and the receiving device 110 of the OFDM system shown in FIG. 1 using a Quadrature Phase Shift Keying (QPSK).

As shown in FIG. 2, at 1E-4 of BER corresponding to a desired performance for input of QPSK modulated signals, the miniumum input bit for the FFT producing a difference of Eb/No of 0.1 dB or below with respect to the theoretical graph is 7 bits or above.

Figure 3:
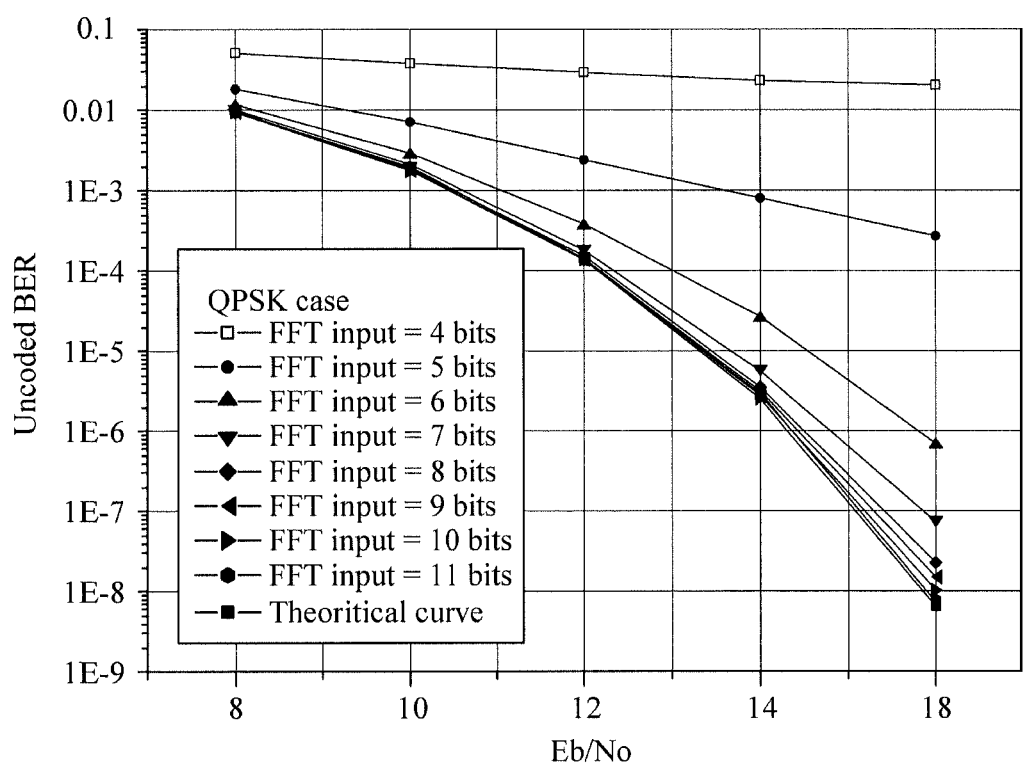
FIG. 3 is a graph illustrating the BER performance when a 16 QAM modulation is used in the OFDM system.

FIG. 3 illustrates the BER performance when 16 QAM modulation is used on the OFDM system.

In FIG. 3, Uncoded BER performance is obtained by simulating the transmitting device 100 and the receiving device 110 of the OFDM system shown in FIG. 1 using 16 Quadrature Amplitude Modulation (QAM)

As shown in FIG. 3, at 1E-5 of BER corresponding to a desired performance for input of 16 QAM modulated signals, the minimum input bit of the FFT producing a difference of Eb/No of 0.1 dB or below with respect to the theoretical graph is 8 bits or above.

Figure 4:
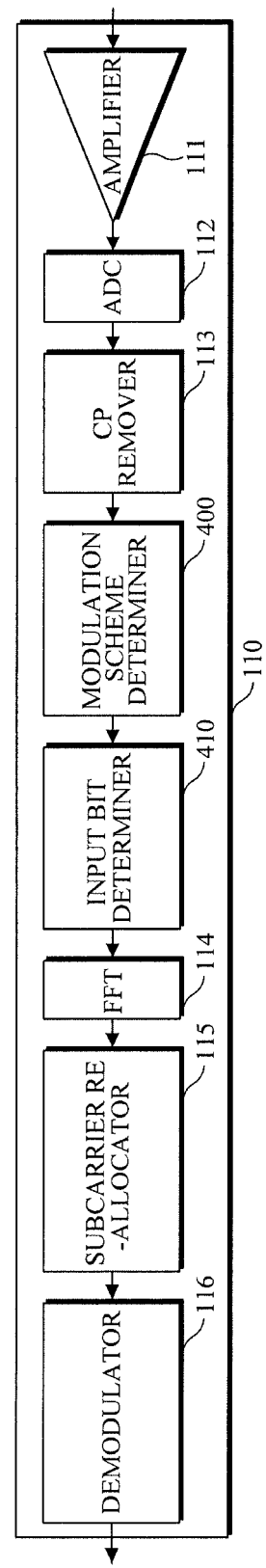
FIG. 4 is a block diagram illustrating the configuration of an example of a receiving apparatus in the OFDM system.

FIG. 4 is a diagram illustrating the configuration of an example of a receiving apparatus of the OFDM system.

The configuration of a receiving apparatus shown in FIG. 4 is identical to that of the receiving device 110 shown in FIG. 2 except for a modulation scheme determiner 400 and an input bit determiner 410.

The modulation scheme determiner 400 and an input bit determiner 410 are disposed between the CP remover 113 and the FFT 114.

The modulation scheme determiner 400 determines a modulation scheme of the received signal. In general, it is determined whether the modulation scheme is a QPSK or a QAM.

If the modulation determiner 400 determines that the OFDM signal is a Quadrature Phase Shift Keying (QPSK) signal, the input bit determiner 410 controls input bits such that only the upper most 7 bits are used among all bits input to the FFT 114. In addition, the input bit determiner 410 controls input bits such that only the upper most 8 bits are used among all bits input to the FFT 114, if the modulation determiner 400 determines that the OFDM signal is a 16 Quadrature Amplitude Modulation (16 QAM) signal.

The FFT 114 receives the input bits, which are controlled by the input bit determiner 410, and performs a signal transformation. Thereafter, the respective components 115 and 116 operate to recover the original signal.

Figure 5:
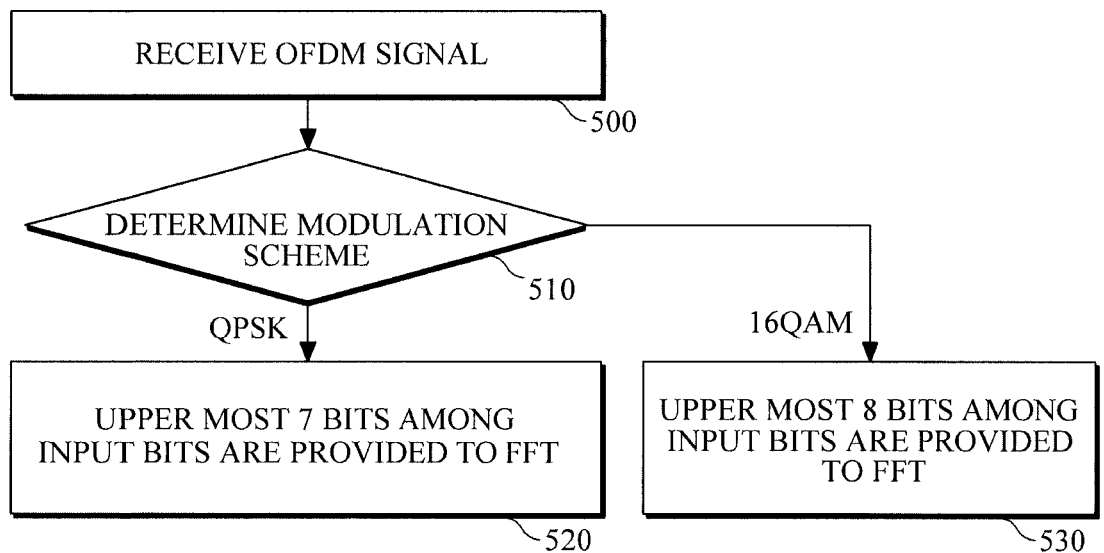
FIG. 5 is a block diagram illustrating the control flow of an example of a reception process in the OFDM system.

FIG. 5 is a flowchart illustrating the control flow of an example of a reception process of the OFDM system.

A receiving apparatus on an OFDM system receives an OFDM signal that is modulated according to a predetermined modulation scheme (500). The OFDM system includes a transmitting apparatus, which performs a modulation through an Inverse Fast Fourier Transformer (IFFT) and transmits the modulated signal, and the receiving apparatus which demodulates the received OFDM signal through an Fast Fourier Transformer (FFT).

The modulation scheme performed on the received OFDM signal is determined (510). In general, the modulation scheme performed in the OFDM system is QPSK or QAM modulation scheme.

If the determined modulation scheme is a Quadrature Phase Shift Keying (QPSK), upper 7 bits of the OFDM signal are provided as input bits for the FFT that is included in the receiving apparatus (520).

If the determined modulation scheme is a 16 Quadrature Amplitude Modulation (16 QAM), upper 8 bits of the OFDM signal are provided as input bits for the FFT (530).

The OFDM system may receive an OFDM signal including a signal, which is modulated by the transmitting apparatus, and noise and process the received OFDM signal. In the determining of the modulation scheme in operation 510, a modulation scheme may be determined on a signal that is obtained by converting a received OFDM signal to a digital signal and removing Cyclic Prifix from the digital signal.

The disclosure can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion.

Also, functional programs, codes, and code segments for accomplishing the present invention can be easily construed by programmers skilled in the art to which the present invention pertains. A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A receiving apparatus for providing input bits for a Fast Fourier Transformer (FFT) on an Orthogonal Frequency Division Multiplexing (OFDM) system using Fourier Transform (FT), the receiving apparatus comprising:
    a modulation scheme determiner configured to determine a modulation scheme of an OFDM signal received in the OFDM system; and
    an input bit determiner configured to provide upper 7 bits of the received OFDM signal as input bits to the Fast Fourier Transformer, in response to the modulation scheme determiner determining that the received OFDM signal is a Quadrature Phase Shift Keying (QPSK) signal.

2. The receiving apparatus of claim 1, wherein the input bit determiner is configured to provide upper 8 bits of the received OFDM signal as input bits to the Fast Fourier Transformer in response to the modulation scheme determiner determining that the received OFDM signal is a 16 Quadrature Amplitude Modulation(16 QAM) signal.

3. The receiving apparatus of claim 1, wherein the received OFDM signal is converted to a digital signal and a Cyclic Prefix (CP) is removed from the digital signal.

4. An Orthogonal Frequency Division Multiplexing (OFDM) signal receiving method for providing input bits for a Fast Fourier Transformer (FFT), the method comprising:
    receiving an OFDM signal modulated according to a modulation scheme in an OFDM system;
    determining the modulation scheme of the received OFDM signal; and
    providing upper 7 bits of the received OFDM signal as input bits to the FFT of a receiving apparatus in the OFDM system, in response to the modulation scheme being determined as Quadrature Phase Shift Keying (QPSK).

5. The method of claim 4, further comprising providing upper 8 bits of the received OFDM signal as input bits to the FFT, in response to the modulation scheme being determined as a 16 Quadrature Amplitude Modulation (16 QAM).

6. The method of claim 4, wherein the received OFDM signal comprises noise and a signal, wherein the signal is modulated by a transmitting apparatus of the OFDM system.

7. The method of claim 4, further comprising:
    converting the received OFDM signal to a digital signal; and
    removing a Cyclic Prefix (CP) from the digital signal.

* * * * *